US012728413B2

(12) United States Patent
Demir et al.

(10) Patent No.: US 12,728,413 B2
(45) Date of Patent: Sep. 8, 2026

(54) MICROFLUIDIC CHIP AND ITS PRODUCTION

(71) Applicant: GENZ BIYO TEKNOLOJI ANONIM SIRKETI, Ankara (TR)

(72) Inventors: Caner Demir, Istanbul (TR); Murat Ozturk, Istanbul (TR); Volkan Can, Istanbul (TR)

(73) Assignee: Taiga Biyoteknoloji Limited Şirketi, Bakirköy/Istanbul (TR)

( * ) Notice: Subject to any disclaimer, the term of this patent is extended or adjusted under 35 U.S.C. 154(b) by 452 days.

(21) Appl. No.: 18/562,995

(22) PCT Filed: May 25, 2022

(86) PCT No.: PCT/TR2022/050481
§ 371 (c)(1),
(2) Date: Nov. 21, 2023

(87) PCT Pub. No.: WO2022/250639
PCT Pub. Date: Dec. 1, 2022

(65) Prior Publication Data
US 2024/0216910 A1 Jul. 4, 2024

(30) Foreign Application Priority Data
May 25, 2021 (TR) ................................ 2021/008604

(51) Int. Cl.
*B01L 3/00* (2006.01)

(52) U.S. Cl.
CPC ... *B01L 3/502707* (2013.01); *B01L 3/502715* (2013.01); *B01L 2200/025* (2013.01); *B01L 2200/12* (2013.01); *B01L 2300/0848* (2013.01)

(58) Field of Classification Search
CPC ......... B01L 3/502707; B01L 3/502715; B01L 2200/025; B01L 2200/12; B01L 2300/0848
See application file for complete search history.

(56) References Cited

U.S. PATENT DOCUMENTS

2008/0085551 A1* 4/2008 Kim ........................ B01F 33/30 438/1
2015/0185118 A1* 7/2015 Pieprzyk ................ C12Q 1/686 436/180
2016/0318019 A1* 11/2016 Ledden ............. B01L 3/502715

* cited by examiner

*Primary Examiner* — Jennifer Wecker
*Assistant Examiner* — Britney N. Washington
(74) *Attorney, Agent, or Firm* — Jose Cherson Weissbrot

(57) ABSTRACT

The invention is concerned with the production process of a microfluidic chip developed to identify antibodies and proteins, as well as cellular types, viruses and bacteria in the blood to be used in the medical device industry.

15 Claims, 1 Drawing Sheet

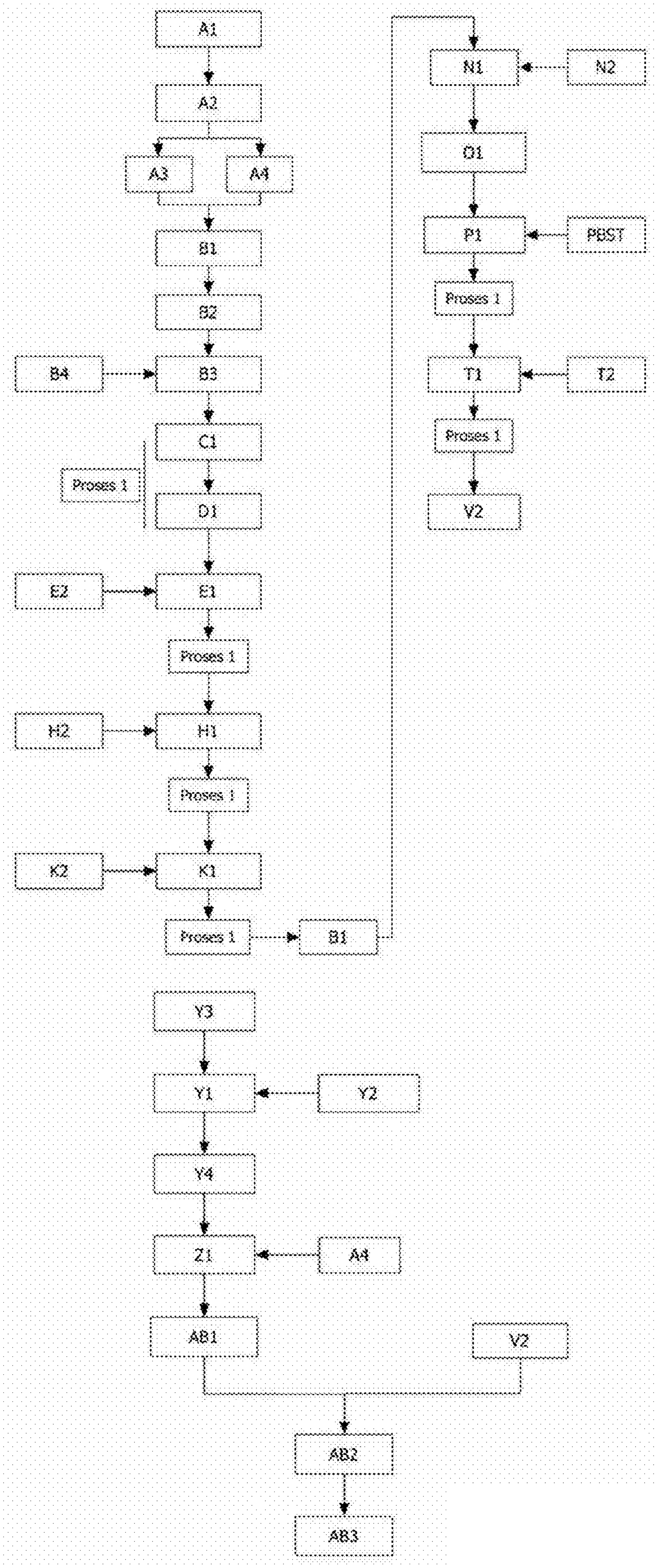
A1
A2
A3
A4
B1
B2
B4
B3
C1
Proses 1
D1
E2
E1
Proses 1
H2
H1
Proses 1
K2
K1
Proses 1
B1
N1
N2
O1
P1
PBST
Proses 1
T1
T2
Proses 1
V2
Y3
Y1
Y2
Y4
Z1
A4
AB1
V2
AB2
AB3

MICROFLUIDIC CHIP AND ITS PRODUCTION

TECHNICAL FIELD

The invention is concerned with the production process of a microfluidic chip developed to identify antibodies and proteins, as well as cellular types, viruses and bacteria in the blood to be used in the medical device industry.

PRESENT STATE OF THE ART

The antibodies and various proteins in the blood are utilized as indicators for medical diagnoses and onsets and courses of various diseases. Identifying the level of antibodies in the blood provide important medical data. When a bacteria, virus or biological structure that has the potential to cause illnesses in the body stimulates the immune system, antibodies against these stimulants are developed. Identification of the existence and the levels of these antibodies reflect the sufficiency of the immune system of the individual against such diseases. On the other hand, there are various antibody types in the blood such as IgG, IgM and IgA and levels of such antibodies increase at various times after the reaction of the immune system. Identification of the levels of these antibodies can provide information about the phase of the immune reaction of the individual and even the approximate onset of the disease. For example, the level of antibodies in the blood of an individual whose immune system reacted against the SARS-CoV-2 virus or the vaccines developed against this virus reflects the efficiency of the immune system. The levels of some indicators present in the blood change in diseases such as cardiac illnesses, renal problems and cancer. As an example, the levels of troponin in the blood which increase as a result of myocardial damage is an extremely important indicator before heart attack and additionally, since it is also released during heart attack that do not cause extremely serious physiological consequences, it is utilized for the diagnosis of heart attack.

The most common technique for the identification of the said blood protein is ELISA (enzyme-linked immunosorbent assay). With the ELISA technique, mostly on a plastic surface, a protein coating is produced, with which the desired protein from the blood can bond. The coated surface is generally located in microplates with a base area of 35 mm2 and consisting of 96 wells. In a suitable solution, the proteins used for the coating are used as 50-100 microlitres per well. The coating durations, depending on the temperature, can take up to 18 hours. At this stage, with the purpose of coating the uncoated areas, blocking is conducted with a protein such as BSA (bovine serum albumin). The testing stage starts with the process of providing blood samples for the wells. Subsequently, after a 20 to 30 minutes waiting duration and a couple of washes, it is required to introduce the antibody conjugated with HRP (horseradish peroxidase) and wait for another 20 to 30 minutes. The process of shaking is generally conducted while waiting. Finally, after a couple of washes, by introducing a molecule such as TMB (3,3',5,5'-Tetramethylbenzidine) into the medium and subsequent colour changes are identified with methods based on the absorbance.

Elisa for Vegf is stipulated in European Patent Document numbered EP2069798B1. In this regard, the activity of vascular endothelial growth factor (VEGF) in the blood circulation or other biological samples of the patient, can be utilized as a diagnostic and prognostic index for cancer, diabetes, cardiac conditions and other pathologies. The antibody-sandwich ELISA methods and kits for VEGF are provided to identify VEGF types in the biological samples received from animal models and human patients and can be used as a diagnostic/prognostic index.

The testing plates used in such methods are produced not only to conduct tests on a single person but generally for 96 people. In this regard, they cannot be used as POCTs (point of care tests). On the other hand, the test has a response duration of at least one hour and it is not suitable for conditions that require fast results. Also, the amount of protein used for the coating of the wells employed for the tests is higher and this condition makes it necessary to increase the production of the protein required for the test. The devices used to read ELISA tests are usually desktop type devices and portable devices that are still being developed and are yet to be commonly used. In this regard, this test is still dependent on the laboratory medium. Even though ELISA is a sensitive method, it has low efficiency regarding time and solution usage amount as a result of the design of the usable systems. In order to prevent this, other test types which include a lot more wells such as 384 wells but require robotic systems, have been developed.

Other common methods used to identify blood proteins are systems called card tests or capillary tests which work according to the horizontal flow test principle. In this regard, it is fundamentally aimed to bond the blood antibodies of the patients with the proteins impregnated on absorbent surfaces such as nitrocellulose and to read the results through the secondary antibodies that bond with them.

It is possible to encounter sensitivity problems with these tests caused by various reasons. Primarily, the sample on the card moves with horizontal flow movement and the density of the blood affects this movement. If there aren't enough antibodies in the blood and the sample is received during the onset of the disease, it may be hard to identify antibodies. While the blood is moving through the card, it is also expanding on the card and fewer antibodies reach the main reading section compared to the location of the sample. This results in decreased sensitivity. On the other hand, the most important problem in card tests is the fact that it is hard to calibrate the incubation duration. After the sample is provided, it continuously moves forward and as it stops, it may rapidly move past the reading section, thus, the readable antibodies may be left out of the reading section. Another problem is that, when it is required to conduct washing in order to increase sensitivity and correct reading, it is practically hard to efficiently apply this to card tests. Additionally, since the secondary antibodies located on the cards are also moving towards the reading section on which the antigens are located, together with the blood sample, it may result in these secondary antibodies not efficiently interacting with the human antibodies. Aside from these, the errors in the installation of the cards which consist of multiple components such as the sample bed, conjugation pillows and absorbent pad, may affect the characteristics of the flow and as a result, it is possible to encounter problems such as slow or non-homogeneous flows.

Microfluidics is a fast-developing new field employed for various reasons based on the movement of low-volume liquids in various channels and reservoir structures. Studies concerning the creation of testing devices for medical diagnoses by using microfluidic techniques are expedited. Generally speaking, stages of the production of blood testing systems using microfluidics can be described as, in no particular order, the creation of channel structures on the material, the chemical activation of the material, coating the desired zone with the proteins and the creation of isolated flow zones by closing the system. The materials of these products called microfluidic chips are usually PDMS (polydimethylsiloxane), PMMA (polymethylmethacrylate), polystyrene, glass and other materials.

A microfluidic chip utilized to identify nucleic acid consisting of an extraction and purification unit in order to extract and purify the molecules of nucleic acid in a biological sample is described in the Chinese patent document number CN212247004. This chip consists of the first amplification zone connected to the extraction and purification unit used to actualise the first amplification on the nucleic acid molecules and at least two second amplification zones used to actualise the inter-bedded amplification on the nucleic acid molecules after the first amplification. In this regard, both second amplification zones are related to the first amplification zone.

For the creation of the channels of microfluidic chips, generally, the heat curing method is used for the solid polymeric surfaces created with curing processes such as PDMS. In this regard, primarily, the main mould is created with the photo-resist polymers by using light masks on materials called silicon-based special chip plates (wafer). Subsequently, actual chips are produced by using these moulds. However, since the channels of these chips are in the open position, it is required to cover them with a surface such as glass or PDMS and make the channels suitable for the flow. Since the PDMS polymer, because of its surface characteristics and hydrophobic features, causes undesired proteins to bond with the surface, for example, by limiting its movement, also affects the separation and sensitivity performance of the testing system. Additionally, the fact that the PDMS is hydrophobic, makes it hard for blood, blood serum, protein solutions and water-based solutions or water-organic solution mixes to spread through the channel in a suitable and homogeneous manner. Since microfluidic testing systems are usually used for liquids and solutions which are polar in nature, this condition creates an important limitation for the use of PDMS material concerning microfluidic-based testing systems. Because of these reasons, it is required to alter the surface structure of the PDMS material and for this purpose, the method of decreasing the hydrophobicity is utilized by using plasma activation or amphiphilic polymers in accordance with their suitability for industrial production. The industrial devices used for the plasma activation are high in cost and it is possible to protect the stability of the surface activation after plasma activation, for up to 3 days. On the other hand, the usage of amphiphilic polymers increases the risk of distention and the optic permeability decreases as the rate of amphiphilic use increases.

With thermoplastic polymers such as PMMA, polycarbonate, polystyrene, and cyclic olefin copolymer, it is possible to use different methods for the production of microfluidic chips. Injection moulding technique, hot pressing technique, laser processing technique and mechanical microprocessing technique are primarily utilized to shape the material. Las processing and mechanical microprocessing techniques disturb the optical features of the material. Accordingly, it is not suggested to utilize such methods for applications placing high importance on optical permeability. Injection moulding and hot pressing techniques, provide more suitable materials with channel structures concerning the optic features. Since these plastic materials are hydrophobic in their nature, it is required to activate their surfaces. In this regard, plasma and chemical methods can be employed. Acidic or alkaline chemicals are used for the surface activation. On the other hand, it is possible to make the surface functional with physical interactions, without surface activation. However, this method decreases binding efficiency.

When the chip is produced from plastic materials, it is required to cover its channels appropriately. Therefore, isolated impermeable channel systems can be achieved. There are various closing methods developed for this purpose. For example, two plastic pieces can be attached to each other with heat under high pressures. If a part is coated with proteins, this method damages the temperature-sensitive proteins and disturbs the sensitivity of the test. Another closing strategy is closing the preferred plastic plate by using solvent chemicals such as ethyl alcohol-water mixtures, chloroform, acetic acid, etc. or by using the UV curing technique with resin adhesives. Usage of these methods causes a high risk of the chemicals or the surface polymer interacting with these chemicals to leak into the channels of the chip and block off the coated protein surface and this is a great obstacle to the repeatability of the system. In this regard, it is difficult to use the said strategy in industrial production processes.

Another employed strategy is the ultrasonic welding method. With this method, the surfaces desired to be closed are pressed against each other at certain pressures and are exposed to ultrasonic vibration, the rising temperature as a result of this vibration ensures that the polymeric materials are melted and merged. Similarly, this method has the risk of high temperature and melted polymers leaking into the channels and damaging the coated protein or making them inefficient. All of these closing methods are more suitable to coat the surface of the channel with proteins after the chips are closed. However, these methods are not suitable to ensure that certain sections inside the channels and smaller zones are coated with the same or different protein structures, and it is required to develop new closing strategies for this purpose. The important issue is to ensure that proteins coating various zones alongside the channel surface are not damaged by the chip closing process and to prefer a closing method that would not affect the testing efficiency. The method which can be used for this purpose is the closing of the chip surfaces with a double-sided tape. With this method, the desired channels are cut and processed on the double-sided and double-blind-ended tapes with a laser in a sensitive manner. Subsequently, the tape with a single blind side is placed on the desired plastic surface and other blind side is opened and the second plastic part is attached to this surface. Therefore, the height of the channel is equal to the thickness of the preferred double-sided tape. However, if there are holes, waste reservoirs and similar structures are located on the plastic chips, these structures are to be lined up with the channels. The double-sided tape method mentioned above provides no issues regarding the line-up process and with this method, there is no need to develop a different process suitable for industrialization.

Conventionally, two methods are being used for the protein coating of the microfluidic channels. The first of which, before the chips are closed, is to immerse the chips into a solution prepared with the desired coating protein and close them, the other is, after the chips are closed, to fill the channels with the protein solution and let it sit for a sufficient period or to continuously move the protein solutions through the channels with a pump. On the other hand, the methods which can be applied in case of desiring to only cover the certain sections of the microfluidic channels with one or multiple protein types prior to closing the chips, are quite limited and are inefficient concerning their scalability and repeatability in industrial production. With the current methods, the protein coating process is being conducted by pumping the desired protein solution through the channels with pumps after the chips are closed and this decreases the production speed as well as increases the required amount of protein for the production. Another technique used to bond proteins to the surface is adding auxiliary substances such as sucrose into the protein solution to prevent denaturation during the drying stage. However, even with this method, the evaporation duration of the protein solutions used at microlitre levels is not able to exceed a few minutes. In this regard, it is identified that protein bonding efficiency and repeatability are quite low.

Since it is desired that the protein binds with the surface of the chip through covalent bonds in a standard and stable manner, the temperature and waiting durations become important. Protein solutions dropped on the channel with very smaller volumes at a couple of microlitre levels, start to dry up in a matter of few minutes even at room temperature and decrease the efficiency of the coating. In order to overcome this problem, some agents which slow down the evaporation but do not harm the protein structure such as sucrose are added into the protein solution. However, this method proves to be ineffective when the incubation temperature reaches temperatures required for the efficient binding of the protein (between 35 and 40 C).

The standard methods that can be utilized to ensure a humid medium for the protein coating process are spraying with mist and atomization nozzles or humidification with a steam generator. For the spraying method, it is disadvantageous that the droplets have bigger sizes, the medium's duration of reaching humidity saturation is longer and the system installation requires excessive interior furnace volumes as a result of the local pressure caused by the spraying. Additionally, in the spraying method, the transformation of the liquid into an atomized state occurs at a certain distance from the spraying nozzles. Similarly, while the droplets introduced into the medium spread inside the furnace and stick on the surface of the chip, causing wetness on the surface. This condition, depending on the expansion of the coating droplet and decrease of the protein concentration, may result in decreased coating efficiency. Additionally, the expansion of the droplet zone may result in protein coating of the undesired zones of the chip. Since the humidification process with dry mist requires the usage of a pressurized air tank, it causes continuous cold airflow inside the furnace and makes it hard to stabilize its temperature. Since ensuring the humidity of the medium by producing steam with a steam generator causes another problem as it makes it hard to stabilize the temperature of the furnace concerning energy efficiency and the requirement of additional cooling.

It is necessary to provide new solutions to overcome such problems and ensure repeatability and scalability in industrial production.

In conclusion, as a result of the above-mentioned problems and the insufficiency of existing solutions; it was required to conduct further development regarding microfluidic chip and its production processes".

Aim of the Invention

Current invention is concerned with microfluidic chip and its production processes and meets all the above-mentioned requirements, eliminates all disadvantages and provides additional advantages.

The primary purpose of the invention is to ensure a process which provides full control concerning the surface geometry and surface functions of microfluidic channeled chips produced from various plastic materials.

The purpose of the invention is to develop a method which makes it possible to close the chips without any heat treatment after they are coated with the desired number of proteins on certain locations of the microfluidic channels and throughout the channel and to conduct these processes in a suitable manner for mass production.

Another purpose of the invention is to develop a method with which the number of chips produced per unit of time is higher and the unit price for the chips is lower.

In order to actualise the above-mentioned purposes, the invention is;

A. microfluidic production process consisting of the following processes; production of the 3 dimensionally designed one bottom chip and one upper lid chip components with injection moulding technique.
B. Cleaning of the bottom chip surfaces with isopropyl alcohol solution by immersing them into a primary immersion tank consisting of at least one basket in which at least one chip cartridge system is located and drying them with a ventilation drying system;
C. Activation of the bottom chip surfaces with sodium hydroxide solution by immersing them into a secondary immersion tank consisting of at least one basket in which at least one chip cartridge system is located and drying them with a ventilation drying system;
D. The first modification of the bottom chip surfaces with Polyethyleneimine solution by immersing them into a third immersion tank which consists of at least one basket in which at least one chip cartridge system is located and drying them with a ventilation drying system;
E. The second modification of the bottom chip surfaces with glutaraldehyde solution by immersing them into a fourth immersion tank which consists of at least one basket in which at least one chip cartridge system is located and drying them with a ventilation drying system;
F. With a microdispensary, dripping the protein solution on chips which were twice modified, washed and dried;
G. Incubating the bottom chips on which the protein solution is dripped, within an incubator system with diffuser humidification which provides humidity;
H. Washing the bottom chip surfaces with a PBST solution by immersing them into a fifth immersion tank which consists of at least one basket in which at least one chip cartridge system is located and drying them with a ventilation drying system;
I. Blocking the bottom chips with bovine serum albumin (BSA) solution by immersing them into a sixth immersion tank which consists of at least one basket in which at least one chip cartridge system is located and drying them with a ventilation drying system; resulting in protein-coated bottom chips;
J. With a vacuum plate system connected to a vacuum pump and line, through a laser cutting device with vacuum, following the double-sided tape cutting, the double-sided cut tape is produced;
K. By attaching the upper lid to one of the sides of the double-sided cut tape, making the double-sided tape lid;
L. By attaching the double-sided tape lid with the installation mechanism and placing the Protein-coated bottom chip, making the microfluidic chip;

It is possible to understand all the structural and characteristic features of the invention through the below-given FIGURES and detailed explanations referencing these FIGURES and it is required to conduct the assessment in consideration of these FIGURES and detailed explanations.

FIGURES SUPPORTING THE EXPLANATION OF THE INVENTION

FIG. 1: Process Flow Chart

EXPLANATION OF THE REFERENCES

A1 Three dimensional design
A2 Bottom Chip
A3 Upper Lid
A4 Injection Moulding
B1 Cartridge
B2 Basket
B3 The Primary Immersion Tank
B4 Isopropyl Alcohol Solution
C1 Water Spraying System
D1 Ventilated Drying System
E1 The Secondary Immersion Tank
E2 Sodium Hydroxide Solution
H1 The Third Immersion Tank
H2 Polyethyleneimine Solution
K1 The Fourth Immersion Tank
K2 Glutaraldehyde Solution
N1 Microdispensary
N2 Protein Solution
O1 Incubation System with Diffuser Humidification
P1 The Fifth Immersion Tank
P2 PBST Solution
T1 The Sixth Immersion Tank
T2 bovine serum albumin solution
V2 Protein Coated Bottom Chip
Y1 Vacuumed Plate System
Y2 Vacuum Pump and Line
Y3 Double Sided Tape
Y4 Laser Cutting Device with Vacuum
AB1 Double Sided Tape Lid
AB2 Installation Mechanism
AB3 Microfluidic Chip

DETAILED EXPLANATION OF THE INVENTION

With this detailed explanation, the subject of the invention, the microfluidic chip and its production processes are explained in order to better conceptualize the subject and without creating any limiting effects.

The subject of the invention, the microfluidic chip and its production processes, at the fundamental level, consists of the following stages;

A. Production of a pre 3 dimensionally designed (A1) bottom chip (A3) and an upper lid (A4) chip with injection moulding (A4) technique;

B. Cleaning of the bottom chip surfaces (A3) with Isopropyl alcohol solution (B4) by immersing them into a primary immersion tank (B3) consisting of at least one basket (B2) in which at least one chip cartridge system (B1) is located; washing them with distilled water by a spraying system preferably (C1) and drying them with a ventilation drying system (D1).

C. Activation of the bottom chip surfaces (A3) with sodium hydroxide solution (E2) by immersing them into a secondary immersion tank (E1) consisting of at least one basket (B2) in which at least one chip cartridge system (B1) is located and washing them with distilled water by a spraying system preferably (C1) and drying them with a ventilation drying system (D1).

D. The first modification of the bottom chip surfaces (A3) with Polyethyleneimine solution (H2) by immersing them into a third immersion tank (H1) which consists of at least one basket (B2) in which at least one chip cartridge system (B1) is located and washing them with distilled water by a spraying system preferably (C1) and drying them with a ventilation drying system (D1).

E. The second modification of the bottom chip surfaces (A3) with Glutaraldehyde solution (K2) by immersing them into a fourth immersion tank (K1) which consists of at least one basket (B2) in which at least one chip cartridge system (B1) is located and washing them with distilled water by a spraying system preferably (C1) and drying them with a ventilation drying system (D1).

F. With a microdispensary (N1), dripping the protein solution (N2) on chips which were twice modified, washed and dried;

G. Incubating the bottom chips (A3) on which the protein solution is dripped, within an incubator system with diffuser humidification (O1) which provides humidity;

H. Washing the bottom chip (A3) with a PBST solution (P2) by immersing them into a fifth immersion tank (P1) which consists of at least one basket (B2) in which at least one chip cartridge system (B1) is located and washing them with distilled water by a spraying system preferably (C1) and drying them with a ventilation drying system (D1).

I. Blocking the bottom chips (A3) with bovine serum albumin (BSA) solution (T2) by immersing them into a sixth immersing tank (T1) which consists of at least one basket (B2) in which at least one chip cartridge system (B1) is located and washing them with distilled water by a spraying system preferably (C1) and drying them with a ventilation drying system (D1); resulting in protein-coated bottom chips (V2);

J. With a vacuum plate system (Y1) connected to a vacuum pump and line (Y2), through a laser cutting device with a vacuum (Y4), following the double-sided tape (Y3) cutting, the double-sided cut tape (Z1) is produced;

K. By attaching the upper lid (A4) to one of the sides of the double-sided cut tape (Z1), making the double-sided tape lid (AB1);

L. By attaching the double-sided tape lid (AB1) with the installation mechanism (AB2) and placing the protein-coated bottom chip (V2), making the microfluidic chip (AB3);

For a preferred application of the invention, the bottom chip (A3) is equipped with a waste reservoir in which the wastes caused by washing and other processes accumulate and airflow holes which ensure airflow during the vacuum attaching process. Structures which prevent air bubbles from forming during the flow are located on the bottom chip (A3) and upper lid (A4). If desired, the design of the chip and microfluidic channel design can be conducted separately with the invention's subject production method. Therefore, it is possible to use the chips with the same design for different microfluidic channel designs in accordance with different applications and purposes.

Between the process stages of "b" and "e" of the invention's subject method, the primary and secondary chemical modification take place. During the exemplary application of the invention, these stages are actualised as follows. The bottom chip (A3) is placed in cartridges (B1) which, preferably, have special housings for the chips. Each cartridge (B1), preferably, can have a single line of housings for 5 to 20 chips or 10 lines of chip housings. Optimally, cartridges (B1) are produced from plastic materials such as cestamide, PTFE, PMMA, polycarbonates or materials which are not affected from acids and alkalines such as stainless steel. These cartridges (B1) are preferably stacked on top of each other and placed into the basket (B2). Since cartridges (B1) placed in optimal areas to allow fluid movements will occupy a certain portion of the volume of the tank, the amount of solution required for the coating decreases. With the vertical movement provided by the crank system, required mixing is ensured just by the movement of the baskets (B2) without requiring any additional mixing from magnetic or mechanic mixing apparatuses. Since the basket (B2) and cartridge (B1) systems hold all the chips together, the flow between the stages of the process becomes easier. At the "b" process stage, baskets (B2) are immersed into the primary immersion tank (B3) housing aqueous Isopropyl alcohol solution (B4) with a preferable concentration of 10 to 50% (more preferably 30 to 40%), and are kept there for 1 to 10 minutes (preferably 3 minutes). The immersion tanks developed specifically for the process, are equipped with reservoirs housing the chemical solutions used in the process. Different tanks are used for different chemical solutions. The immersion tanks, by moving vertically thanks to the engine connected to a crank, ensure that the baskets which house cartridges and are placed inside of it, thoroughly mix with the chemical solution. The cartridges are housing systems produced from plastic or metals consisting of housings in which chip components can be placed. Effective cleaning of the chips (A3) located inside the tank (B3) is ensured by immersion tanks (B3) developed specifically for this process which enables baskets to move towards the bottom of the tank vertically. Baskets (B2) taken out of the tank (B3) are rinsed with distilled water. Rinsed chips are dried with an apparatus placed in front of the baskets (B2) and a ventilation drying system (D1) with radial fans which provides 800-2000 m3/hour (preferably 2000 m3/hour) of airflow. While the dried chips (A3) are in the baskets (B2), they are immersed into the secondary immersion tank (E1) which consists of 0.2-3 M (preferably 0.5-1.5 M) sodium hydroxide solution (E2) at 45-70° C. (preferably 55-65° C.) temperatures and they are sat in the immersion tank (E1) for 15-120 minutes (preferably 30-90 minutes) while mixing. Upon the completion of the surface activation system with sodium hydroxide (E2), baskets (B2) taken out of the immersion tank (E1) are rinsed with distilled water. Rinsed baskets (B2) are dried with a ventilation drying system (D1). The chips in the basket (B2) are immersed in a solution of polyethylene (PEI) (H2) for surface modification. PEI (H2) aqueous solution is prepared to have a weighed concentration between 0.1% and 15%, preferably 1-5%. The baskets are immersed into the third immersion tank (H1) at temperatures of 18-45° C., preferably 22-30° C., for 10 to 90 minutes, preferably 30 to 45 minutes in the PEI solution (H2) while mixing. After this process, baskets (B2) taken out of the tank (H1) are rinsed with distilled water. Rinsed baskets (B2) are dried with a ventilation drying system (D1). After the surface amine bonding, the baskets (B2) are immersed into the fourth immersion tank (K1) which consists of Glutaraldehyde solution (K2) with the weighed concentration of 0.1% to 15%, preferably 0.5% to 3%, for 10 to 90 minutes, preferably 30 to 45 minutes, while mixing. They are sat at the temperatures of 18 to 45° C., preferably 22 to 30° C. After this process, baskets (B2) taken out of the tank (K1) are rinsed with distilled water. Rinsed baskets (B2) are dried with a ventilation drying system (D1). After this stage, the chips (A3) are stored in a low-humidity or dry environment under a vacuum and in such a way that they do not receive light. After activation of the chip surface with sodium hydroxide (B4), it is modified with PEI (H2) and GA (K2) to make it ready to bind to any protein. Sodium hydroxide solution (B4) is used to activate the chip surface, that is, to create reactive groups on the chip surface. Polyethylene (H2) and Glutaraldehyde solution (K2) are used to create flexible and appropriately spaced reactive inserts in nano-sizes by modifying the surface to ensure that the protein desired to be coated on the activated chip surface is covalently coated.

In a preferred application of the invention, short-chain alcohols containing ethyl alcohol, methyl alcohol, and butyl alcohol can be used instead of isopropyl alcohol solution. As an alternative to surface activation with sodium hydroxide, the plasma activation technique can also be used. For this purpose, the cassettes on which the chips are lined up are placed on the shelves of the plasma activation device and are processed for 15-120 sec by means of oxygen plasma. For the purpose of surface modification, small moleculed amines such as ethylenediamine, triethylene diamine, and hexaethylene diamine are among amine compounds as well as polymeric compounds which consist of linear or branched amines such as polyethyleneimine or polyethylene oxide diamine instead of PEI. Instead of BSA, small protein molecules such as casein or gelatin can be used. Instead of Tween-20, nonionic surfactants such as Triton X-100 can be used.

The protein coating process takes place between the processing steps "f" to "i" of the method under consideration. During the exemplary application of the invention, these stages are actualised as follows. For the protein coating process, first of all, the cartridges (B1) containing the chips (A3) are placed under the microdispensaries (N1), which can accurately transfer liquid at the level of microlitres to the desired zones. Microdispensaries (N1) are preferably with a fixed plate or conveyor system. As a microdispensary (N1), devices with different fluid transfer systems such as piezoelectric, syringe pump, air pressure, etc. can be utilized. One or more types of coating solutions can be transferred through the same device. The volume of the protein solution (N2) dripped onto the surface may vary depending on the channel width. There is no need to use any additives in the protein solution (N2) to slow down evaporation and prevent protein denaturation that may occur due to drying. By means of a microdispensary (N1), for a channel of 1.5 mm width, preferably 2 microlitres of protein solution is dripped (N2) with a range of 0.5-10 microlitres for the desired point of each coating. No more than 3 minutes after the completion of this operation, the cartridge (B1) in which the chips are placed, is placed into or transferred via a conveyor to the diffuser humidification incubator system (O1) with a balanced humidity level, designed specifically for the process of the invention. The humidity balance of the diffuser humidification incubation system (01) is kept at 25-45° C. (preferably 38° C.) for 2 hours at 90% to 100% relative humidity levels in order to prevent the droplets on the chips from evaporating. For the diffuser humidification incubation systems of 16500 $cm^3$ net volume, air diffusers with a surface area of 50-200 $cm^2$, preferably 100 $cm^2$ or multiple air diffusers equivalent to this surface area. For a diffuser surface area of 100 $cm^2$, a total of 500-1000 Lt/hour of air, preferably 700 Lt/hour, is provided to the diffuser or multiple diffusers separately. In consideration of these rates depending on various furnace volumes required, the diffuser volume and the volume of the required air are calculated. With the diffuser humidification incubator system, the procedure duration of the protein coating varies between 30 minutes to 240 minutes.

The hot air taken from the diffuser humidified incubation system (O1) developed specifically for the invention, by means of an air pump is recirculated and returned to the incubation furnace and circulated online. The internal temperature of the incubation furnace varies between 25° C. and 45° C. The aim here is to prevent the air from cooling down and reducing the temperature of the incubation furnace and therefore to destabilize the humid environment. For this purpose, the pump can be located inside the incubation furnace or outside the furnace and in an environment with the same temperature as inside the furnace. If the pump is outside the incubation furnace, the entire air line connecting the pump to the furnace should also be at the same temperature as the inside temperature of the furnace. The internal temperature of the incubation furnace may vary depending on the structure of the proteins that are desired to be coated on the chip surface.

Chips that complete their waiting duration in the diffuser humidification incubator system (O1) are removed and immersed into the fifth immersion tank (P1) which consists of a weighed Tween-20 concentration of 0.05% to 0.5%, preferably 0.1%, PBS Solution (PBST) (P2) for about 0.5 to 2 minutes, preferably 1 minute while mixing. After this process, baskets (B2) taken out of the fifth (P1) immersion tank are rinsed with distilled water. Rinsed baskets (B2) are dried with a ventilation drying system (D1).

Thanks to the diffuser humidification incubation system (O1) designed specifically for the process in question, the evaporation of protein solutions dripped on the chips in microlitres is prevented during coating and the appropriate temperature and humidity balance are ensured. Thus, there is no need to use any additives that slow down evaporation in the protein solution and prevent protein denaturation that may occur due to drying and may adversely affect the application.

In order to prevent the binding of unwanted types on the active surface where the proteins do not bind and remain idle, the deactivation process is applied. For this purpose, bovine serum albumin (BSA) is used. BSA is prepared and used as an aqueous solution of PBS, the concentration of BSA in the solution is from 1 to 10% by weight, preferably from 3 to 7%. Baskets containing chips are placed in the sixth immersion tank (T1) with BSA solution (T2) for 30 to 240 minutes (preferably 120 minutes) for the duration of the SA blocking process while mixing. The temperature of the tank (T1) is kept at 38° C. Baskets (B2) containing chips which completed the blocking duration, are removed from the tank (T1) and are immersed into the sixth immersion tank (T1) containing PBS solution (PBST) (P2) with a weighed Tween-20 concentration of %0.1 while mixing. After this process, baskets (B2) taken out of the tank (T1) are rinsed with distilled water. The rinsed baskets are dried with a fan drying system. As a result of these processes, the coated bottom chip (V2) is obtained. PBST solution is used to remove excess proteins and BSA blocking agents that could not bond with the surface. The BSA solution is used to deactivate and close the reactive inserts and hydrophobic regions that are not bound by any protein on the chip surfaces.

Since the protein coating process in the process under consideration is performed before the chips are closed off, it makes it possible to create the desired number and type of protein-coated region in different desired regions on one or more channels, allowing multiple tests and parameters to be examined at at the same time for the same sample on the same microfluidic chip. Protein solution or solutions of microlitre levels can be dripped to the desired regions or regions on the chip using a microdispensary (N1) to create the desired number and type of protein-coated areas on the chip surface. Thanks to the diffuser humidification incubation system (O1) developed specifically for the incubation medium required for the protein coating solution (N2), it is not necessary to include any additives such as conductors, preservers, denaturation preventers, evaporation reducers and it ensures the coating with protein solutions at microlitre levels. The hot air recirculated from the developed diffuser humidification incubation system by means of an air pump is returned to the incubation furnace and circulated online, which prevents the air from cooling down and lowering the temperature of the incubation furnace and thus destabilizing the humid environment. The humid environment in the diffuser humidification incubation system (O1) is provided by supplying air to the diffusers placed in the water reservoir located in the incubation furnace. Air diffusers can be made from different materials such as polymer, stone, carbon, wood, glass, composite, and metal in a porous structure and allow the air to be distributed and reduced at the macro (>0.5 mm) and micro (<0.5 mm) levels and delivered to the water as a bubble. With the humidification conducted through the air diffusers of the diffuser humidification incubator systems (O2), contrary to the methods of humidification with industrially used mist and atomization nozzles spraying and humidification with steam generator, as a result of the bursting of the thin layer crated on the surface by the air bubbles reaching the surface from the water, micron and sub-micron droplets are created and since these droplets have higher surface area to volume ratios, they effectively turn into the gas phase and effectively ensure and preserve the humidification balance inside the incubation furnace. In this regard, the diffuser humidification incubation system (O1), which we have developed in accordance with the process needs, provides the optimal solution for the developed process. The process of closing the chips occurs between the processing steps "j" to "l" of the method under consideration of the invention. During the exemplary application of the invention, these stages are actualised as follows. The channel structure that is required to be present in the chip is being designed. The channel structure, designed to be compatible with the chip components, is processed using the laser cutting technique on double-sided tape (Y3). For this purpose, a laser cutting device (Y4) with a special vacuum-assisted vacuum plate system (Y1) developed specifically for the process in the question of the invention is used.

The vacuum plate system (Y1) developed specifically for the process in the question of the invention can be installed on any laser cutting device capable of cutting double-sided tape. A vacuum plate system (Y1) is a structure made of metal or plastic with one or more cutting areas on it. On this plate, there are vacuum holes that will correspond to the shape of the cut that will serve as an attaching agent between the bottom and upper chip parts. These vacuum holes are connected to a vacuum system (Y1) such as a vacuum pump or vacuum tank (Y2) via another surface of the plate. Thus, a vacuum is applied to the surface through the holes. The vacuum pump and its line provide the vacuum power needed by the vacuum plate system. With one side open, the side of the double-sided tape closed off by craft paper with acrylic/acrylate surface with its adhesive part having a thickness ranging between 100 to 500 microns (preferably 210 microns), is placed on the surface of the plate with vacuum holes. Double-sided tape (Y3) can be placed to cover one or more cutting areas. The value is measured inflow while the tape is placed on the vacuum plate a vacuum of 600-300 millibars, preferably 400 millibars is applied. The vacuum level should have a level at which would not create any marks on the shapes of the holes on the double-sided tape (Y3). Accordingly, the double-sided tape is kept on the plate. The design which contains microfluidic channel structures through a laser cutting device (Y3), is processed on the double-sided tape (Y3). For laser cutting, parameters concerning the power of 8-20 watts, preferably 15 watts and linear head movement speed of 40 to 150 mm/sec, preferably 80 mm/sec, are applied. After the cutting, the part that will be located between the chips is held on the plate by means of vacuum holes. The residual portions of the unwanted double-sided tape (Y3) are removed from the surface of the vacuum tray manually or by means of a positive printing, tray corresponding to the unwanted portions. The upper cover parts of the microfluidic chip are glued onto the cut double-sided tapes (Y3), which are held by vacuum on the surface of the vacuum plate, while the vacuum continues. In order to align the upper cover towards the tape containing the duct system, there are slits around the cutting areas on the vacuum plate through which the protruding skirts of the upper cover can pass. For covers that do not have transition sleeves, there are wall-shaped heights that can be attached to these slits and surround the cut area in the form of a top cover, and the top covers are placed in this wall-shaped frame and glued to the tape below. Accordingly, the inlet holes, outlet holes, bubble traps or any special geometry located on the upper cover are precisely aligned to the corresponding areas of the double-sided tape with the desired channel structure. After this process, the double-sided tape on the covers obtained (AB1) since the part of the tape facing out is closed, it can be produced, stacked and stored in the required amount before being combined with the bottom chips. In designs where the upper cover passes over the bottom chip by means of a sleeve, the craft part on the upper cover is removed and the bottom chip and upper cover are easily combined. In designs where the upper cover does not have parts to connect to the bottom chip, a mounting assembly is used for the aligned connection of the bottom chip and the upper cover, which surrounds the bottom chip and the upper cover and has a slot where the chips can fit inside. Thus, the bottom chip and the upper cover are combined in an aligned way, resulting in a functional ready-made chip.

Thanks to the laser cutting system with a vacuum plate system (Y1), the channel structure is designed to be compatible with the bottom and the top cover is processed on double-sided tape (Y3) and it is ensured that the upper cover (A4) is glued to the tape with precision. After this process, the double-sided tape on the covers is obtained since the part of the tape facing out is closed, it can be produced, stacked and stored in the required amount before being combined with the bottom chips. Thanks to the special table system (Y1) with vacuum support, the channel design created on double-sided tape (Y3) by using the laser processing technique is integrated with the design produced with the injection moulding technique of chip components and enables the production of complex or multi-layered structures.

The invention claimed is:

1. A microfluidic chip production process characterized by comprising;

A. Production of a 3 dimensionally designed bottom chip (A3) and an upper lid (A4) chip components, with injection moulding (A2) technique B. Cleaning of the bottom chip (A3) surface with an isopropyl alcohol solution (B4) in a primary immersion tank (B3) consisting of at least one basket (B2) in which at least one chip cartridge system (B1) is located and drying them with a ventilation drying system (D1);

C. Activation of the bottom chip (A3) surface with sodium hydroxide solution (E2) by immersing them into a secondary immersion tank (E1) consisting of at least one basket (B2) in which at least one chip cartridge system (B1) is located and drying them with a ventilation drying system (D1);

D. The first modification of the bottom chip (A3) surface with Polyethyleneimine solution (H2) by immersing them into a third immersion tank (H1) which consists of at least one basket (B2) in which at least one chip cartridge system (B1) is located and drying them with a ventilation drying system (D1);

E. The second modification of the bottom chip (A3) surface with glutaraldehyde solution (K2) by immersing them into a fourth immersion tank (K1) which consists of at least one basket (B2) in which at least one chip cartridge system (B1) is located and drying them with a ventilation drying system (D1);

F. With a microdispensary (N1), dripping the protein solution (N2) on chips which were twice modified, washed and dried;

G. Incubating the bottom chips (A3) on which the protein solution is dripped, within an incubator system with diffuser humidification (O1) which provides humidity;

H. Washing the bottom chip (A3) surface with a PBST solution (P2) by immersing them into a fifth immersion tank (P1) which consists of at least one basket (B2) in which at least one chip cartridge system (B1) is located and drying them with a ventilation drying system (D1);

I. Blocking the bottom chip (A3) with bovine serum albumin (BSA) solution (T2) by immersing them into a sixth immersing tank (T1) which consists of at least one basket (B2) in which at least one chip cartridge system (B1) is located and drying them with a ventilation drying system (D1), resulting in protein-coated bottom chips (V2);

J. With a vacuum plate system (Y1) connected to a vacuum pump and line (Y2), through a laser cutting device with a vacuum (Y4), following the double-sided tape (Y3) cutting, the doublesided cut tape (Z1) is produced;

K. By attaching the upper lid (A4) to one of the sides of the double-sided cut tape (Z1), making the double-sided tape lid (AB1);

L. By attaching the double-sided tape lid (AB1) with the installation mechanism (AB2) and placing the protein-coated bottom chip (V2), making the microfluidic chip (AB3).

2. The method according to the claim 1 characterized by the completion of washing procedure with a water spraying system (C1) at process steps "b", "c", "d", "e", "h", "i".

3. The method according to the claim 1 characterized by airflow holes which ensure airflow during the vacuum adhesion process, are located on the bottom chip (A3).

4. The method according to the claim 1 characterized by comprising each cartridge (B1) consists of 10 lines of chip placement housings or a single line of housings for 5 to 20 chip components.

5. The method according to the claim 1 characterized by the bottom chip (A3) is immersed in the primary immersion tank (B3) for 1 to 10, preferably 3 minutes at the process step “b”.

6. The method according to the claim 1 characterized by the ventilation drying system (D1) is a system consisting of a radial fan which provides an airflow of 800 to 2000 $m^3$/hour, preferably 2000 $m^3$/hour.

7. The method according to the claim 1 characterized by bottom chip (A3) is immersed into the secondary immersion tank (E1) for 15 to 120 minutes, preferably 30 to 90 minutes while mixing at process step “c”.

8. The method according to the claim 1 characterized by the bottom chip (A3) is immersed into the third immersion tank (H1) for 10 to 90 minutes, preferably 30 to 45 minutes while mixing at process step “d” while mixing.

9. The method according to the claim 1 characterized by the bottom chip (A3) is immersed into the fourth immersion tank (K1) for 10 to 90 minutes, preferably 30 to 45-minutes while mixing at process step “e” while mixing.

10. The method according to the claim 1 characterized by microdispensary (N1) has piezoelectric or injector pump.

11. The method according to the claim 1 characterized by the humidification levels inside the diffuser humidification incubation system (O1) is kept at 90 to 100% relative humidity levels for 2 hours at 25 to 45° C. to prevent the drops on the chips from evaporating at the process step “g”.

12. The method according to the claim 1 characterized by the bottom chip (A3) is immersed into the fifth immersion tank (P1) for 0.5 to 2 minutes, preferably 1 minute while mixing at the process step “h”.

13. The method according to the claim 1 characterized by the bottom chip (A3) is immersed into the sixth immersion tank (T1) for 30 to 240 minutes, preferably 120 minutes while mixing at the process step “i”.

14. The method according to the claim 1 characterized by the double-sided tape (Y3) has an acrylic/acrylate adhesive surface with a thickness of 100 to 500 microns preferably 210 microns.

15. The method according to the claim 1 characterized by a vacuum of 300 to 600 millibars preferably 400 millibars and linear head movement speed of 40-150 mm/sec with a power of 8-20 watts for the laser cutting at the process step “j”.

* * * * *